May 18, 1926.  
J. M. CRAWFORD  
SIDE WING FOR WINDSHIELDS  
Filed Jan. 18, 1923  
1,585,376  
2 Sheets-Sheet 1
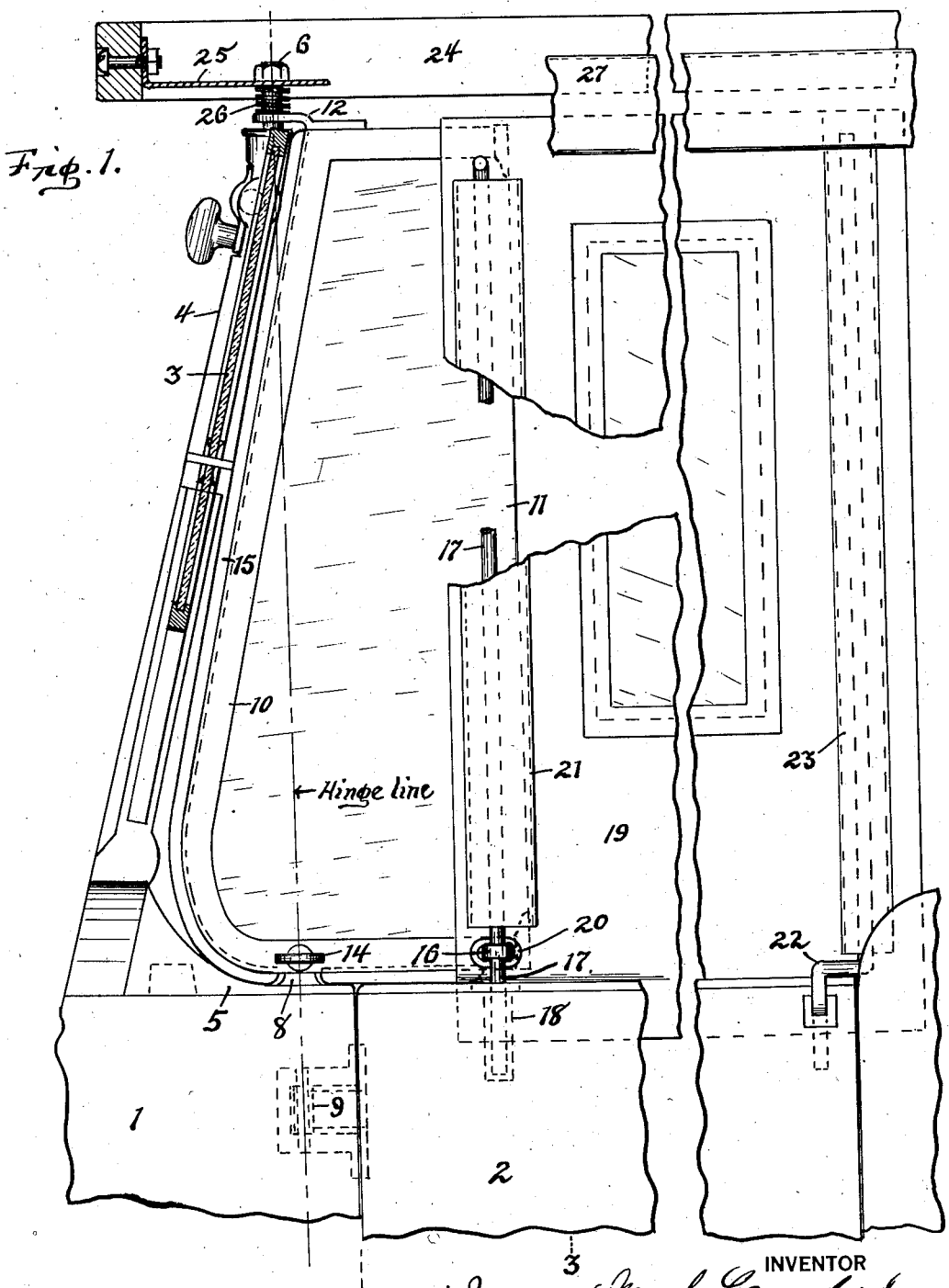

May 18, 1926.
J. M. CRAWFORD
SIDE WING FOR WINDSHIELDS
Filed Jan. 18, 1923 2 Sheets-Sheet 2
1,585,376
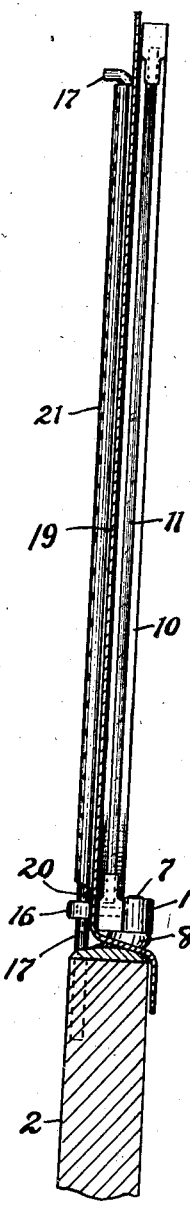
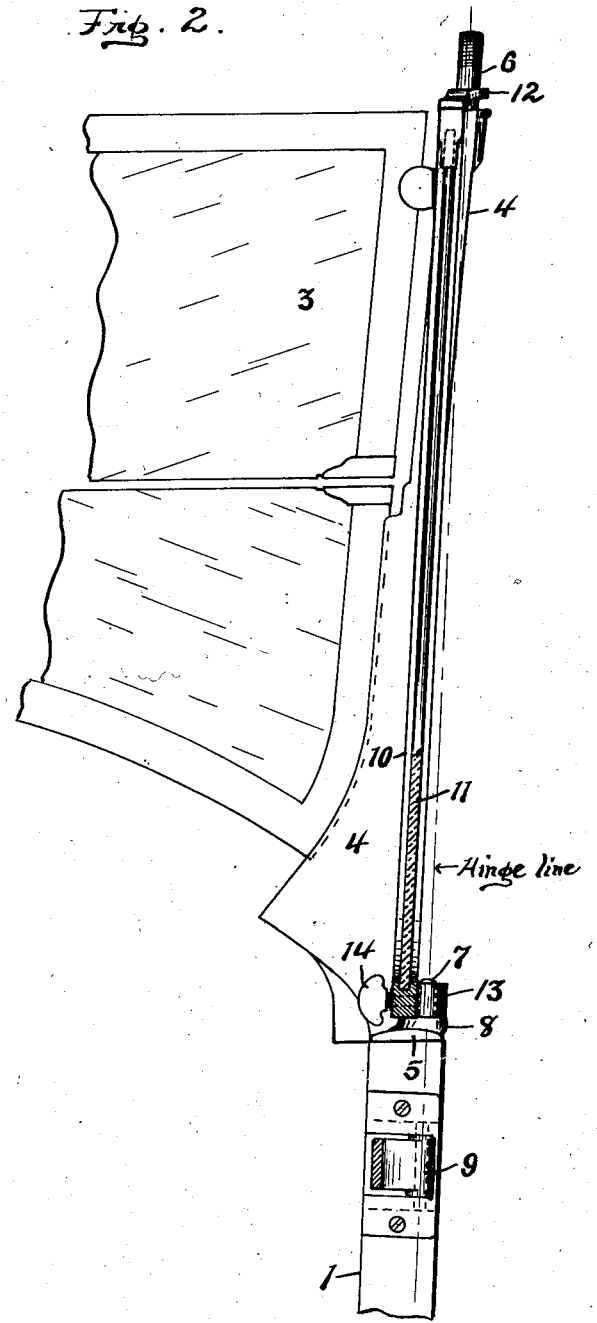
INVENTOR
James Mark Crawford
BY
ATTORNEY Patented May 18, 1926.

1,585,376

UNITED STATES PATENT OFFICE.

JAMES MARK CRAWFORD, OF AUBURN, INDIANA, ASSIGNOR TO AUBURN AUTOMOBILE COMPANY, A CORPORATION OF INDIANA.

SIDE WING FOR WINDSHIELDS.

Application filed January 18, 1923. Serial No. 613,551.

This invention relates to improvements in side wings for windshields, and the objects thereof are: first, to fashion pivoted glass side wings and arrange them in relation with the corresponding windshield standards of a vehicle so they may be adjusted to such positions as to completely close the adjacent side portions of the vehicle, or, selectively turned to such other positions as to deflect the wind either outwardly or inwardly; second, to mount the side wings on a vehicle having windshield standards and side doors so that the wings will swing on axes in common with the hinges of the corresponding doors; third, to provide a curtain extension for each wing, including supports therefor and also means for connecting the wing and the corresponding door so that the wing will automatically swing with the door when it is opened or closed; and fourth, to provide on a vehicle, glass side-wings and curtain extensions therefor so arranged as to completely close the sides of the vehicle without impairing the vision of the driver laterally.

Ordinarily "open" cars are equipped with detachable side curtains for enclosing the space between the top and body of the car, and such curtains are commonly provided with celluloid lights which are not only very fragile but do not long retain their clarity, and thus the driver's view through the sides of the car is often seriously hampered. This condition it is sought to remedy and is included as an object of the present invention.

These objects are accomplished by the construction illustrated in the accompanying drawings, in which:—

Fig. 1 is a side elevation of a side-wing and its extension mounted in connection with the windshield and door of a car as viewed from the interior thereof, parts being broken away and others in section;

Fig. 2 is a rear elevation of one of the windshield standards on the car body and the wing mounted thereon, a portion being shown in section on the line —2 of Fig. 1; and Fig. 3 is a vertical section of Fig. 1 on the line —3 thereof.

The characters appearing in the description refer to parts shown in the drawings and designated thereon by corresponding characters.

The invention is applicable especially to "touring cars", or to that type of automobile having a body 1, side door 2, and a windshield 3 which is supported on the body by side standards 4.

In the construction here shown as an example of the invention, the windshield standards each have a foot 5 that is seated on the side of the body 1, and two studs 6 and 7 respectively, the stud 6 projecting upwardly from the top of the standard and the stud 7 projecting upwardly from a boss 8 on the foot thereof.

The studs 6 and 7 are axially alined with each other, and also with the hinges of the door 2, one hinge 9 of which is shown in the drawings. On each standard is mounted a side-wing frame 10 that contains a glass plate 11, and each frame has at its top a forwardly extending and overhanging bracket 12 that is pivotally connected on the stud 6, and also has at its bottom, on the outer side thereof, a perforated lug 13 that is pivotally connected on the stud 7. Thus, the wing frame may be turned upon the axes of the studs which is indicated by the hinge line appearing on the drawings. A thumb-screw 14 in the frame 10, when tightened against the stud 7, holds the frame in adjusted positions.

Projecting from the front and bottom of the frame 10 is a rubber weather-strip 15 that bears against the adjacent face of the standard 3 when the frame is in closed position, and affords a tight joint between the standard and frame.

The wing frame 10 has at its bottom, projecting from its inner side, a perforated lug 16, and a staff 17 is inserted downwardly through the lug into a socket 18 in the top of the door 2 so that when the door is swung upon its hinges, the wing frame is likewise swung upon the studs on the standard. A curtain 19 is supported upon the door 2 with its forward edge overlapping the rear edge of the wing upon the inner side thereof, and with its lower edge overlapping the upper edge of the door upon the outer side. A grommet 20 in the curtain is held on the lug 16 and against the frame 10 by the staff 17, and the front edge of the curtain is held in connection with the staff by a stall 21 that is sewed to the inner face of the curtain and in which the staff extends. The rear edge of the curtain is supported by another staff 22 of usual construction, that projects upwardly from the rear end of the door, there being a stall 23 on the curtain for connection with the staff. When thus mounted, the curtain, door and wing will swing altogether.

The stud 6 is also utilized as a support for the top bow 24, there being a plate 25 attached to the bow through which the stud extends, and a spring 26 on the stud is interposed between the plate and the bracket 12 on the wing, so that rattling of the wing is prevented. Also a valance 27 attached to the top bow in the usual manner overlaps the upper edge of the wing and its curtain extension upon the inner side thereof; and closes the gap between the wing and bow.

By thus constructing the invention the wing is automatically swung out of the way when the door is opened so that egress and ingress are not obstructed as occurs when the ordinary side wings are employed, and the wings retain their utility and afford "clear vision" even though the side curtains are in position. When the staff 17 is removed, the wing may be turned upon its bearings independently of the door. By moving the rear portion of the wing inwardly, its forward lower edge will be moved outwardly so that wind will be deflected by the wing into the car. By turning the rear portion of the wing outwardly, the wind will be deflected accordingly so as to shelter the occupants of the car.

What I claim is:—

1. In combination with a vehicle having a windshield and hinged side doors, a stud on the top and the base of each standard of the windshield axially alined with the hinges of the corresponding door; a side wing, including a frame and a glass plate mounted therein, said frame having a forwardly overhanging bracket at its upper end and a perforated lug at its lower end, the studs of said standard extending respectively through the bracket and lug; a spring bearing against said bracket; means for securing said frame in adjusted positions; a connecting means between each wing and the corresponding door of the vehicle; and a removable curtain in supported relation with each wing and corresponding door and forming an extension of said wing.

2. In combination with a vehicle having a windshield and hinged side doors, a stud on the top and the base of each standard of the windshield axially alined with the hinges of the corresponding door; a side wing, including a frame and a glass plate mounted therein, pivotally supported on the studs of each standard; a thumb screw in each frame having engagement with the lowermost stud on the corresponding standard; a connecting means between each wing frame and the corresponding door of the vehicle; and a removable curtain supported on each door and forming an extension of the corresponding wing.

3. In combination with a vehicle body including a windshield frame and a hinged door at each side thereof adjacent the frame, a framed glass wing at each side of the body pivotally supported in connection with said body and frame in axial alinement with the hinges of the corresponding door, each door extending rearwardly beyond the corresponding wing; a curtain detachably mounted in connection with each door on the extending part thereof; and supporting means for the curtain on the door having engagement also with the corresponding wing operable to actuate the wing with the door when the latter is opened and closed.

4. In combination with a vehicle body including a windshield frame and a hinged door at each side thereof adjacent the frame, a side wing at each side of the body pivotally supported in axial alinement with the hinges of the corresponding door; and a detachable curtain on each door including supporting means thereon having connection with the corresponding wing operable to actuate it with the door when the latter is opened and closed.

5. In combination with a vehicle body including a windshield frame and a hinged door at each side of the body adjacent the frame, a wing at each side of the body hinged in connection with said body and frame, each door extending rearwardly beyond the corresponding wing; and a curtain supporting means on each door having engagement with the corresponding wing operable to move said wing with the door when the latter is opened and closed.

6. The combination with a vehicle having a wind shield support, and a door hinged adjacent, said support, of a curtain post mounted in said door to which curtains are adapted to be secured for enclosing said vehicle, a wind shield wing, means for attaching the free edge of said wing to said post, and means for pivotally mounting said wing upon said support in alignment with the hinging of said door, whereby said wing may be caused to swing laterally with the movement of said door.

In testimony whereof I affix my signature.

JAMES MARK CRAWFORD.